Patented July 16, 1940

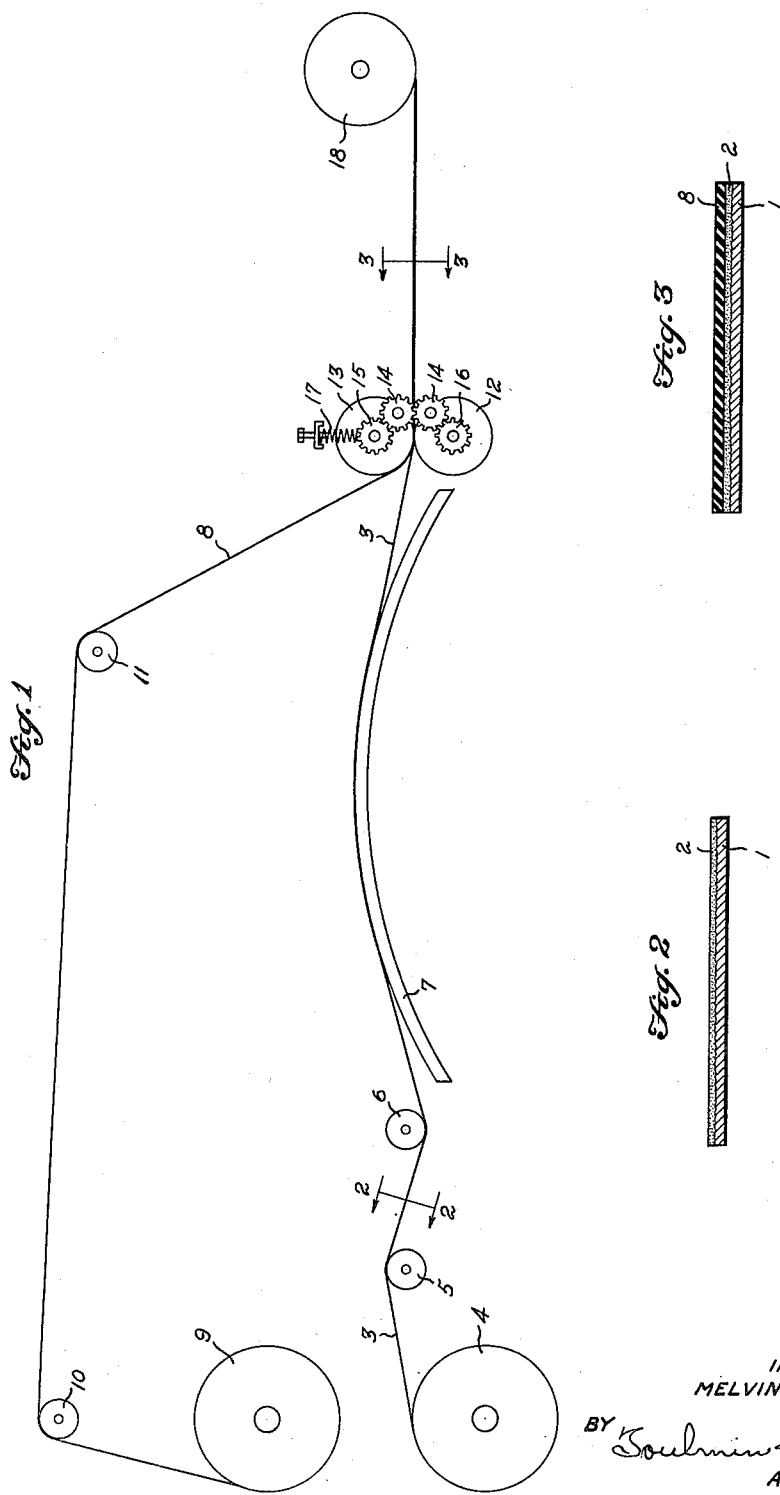

2,208,060

UNITED STATES PATENT OFFICE 2,208,060

METHOD OF PREPARING A CONTAINER MATERIAL

Melvin Wagner, Chicago, Ill., assignor to The Liquid Carbonic Corp., Chicago, Ill., a corporation of Delaware Application January 25, 1937, Serial No. 122,119

5 Claims. (Cl. 154—40)

My invention relates to a method of laminating materials to be used for containers that are substantially gas-tight and moisture-proof. My invention further relates to a material having these same characteristics.

It is my object to provide such a material and method so that the resulting product will be free of all solvent odors, as otherwise such odors would contaminate the materials in the containers made from this material according to my method. Heretofore, it has been impossible to provide laminated materials due to the fact that these solvent odors have been retained almost indefinitely in the material and absorbed by the contents of the containers.

It is the object of my invention to provide a new material consisting of coated glassine paper to which is applied to the adhesive coating, after it has been dried and all the solvent driven off, strips or a layer of thermoplastic material, such as rubber hydrochloride, synthetic resins and the like.

It is a further object to provide in this connection a method which employs a plate or other heating means for preheating the precoated, predried glassine paper only, and to further apply to the heated, coated glassine paper surface the thermoplastic strips or layer, preferably with cool rollers, so that there can be no heating or deformation of the thermoplastic medium being applied to the coated glassine sheets.

In the drawing:

Figure 1 is a side elevation of my invention, diagrammatically illustrating the method of applying the rubber hydrochloride or similar thermoplastic material to the coated glassine sheet.

Figure 2 is a section on the line 2—2 of Figure 1, showing a section through the coated glassine sheet.

Figure 3 is a section on the line 3—3 of Figure 2, showing a section through the combined coated glassine sheet and the thermoplastic sheet applied thereto.

Referring to the drawing in detail, a sheet 1 of glassine paper is coated with a solvent containing adhesive which permits it to be applied by spraying, roller-coating or wiping, or in any other desired manner. This coating is designated 2. A typical coating is a thermoplastic varnish made of one of the vinyl resins. I do not desire to confine myself to the particular material, so long as it is an adhesive from which solvents, such as toluol or the like, can be driven away by heating, air-blasts, etc. This varnish coating is allowed to dry and harden until all of the solvents have evaporated, either naturally or by some artificial means.

Then this composite sheet, which is designated 3, is unwound from a roll 4 thereof, and guided over the guide roll 5, beneath the guide roll 6, over a hot plate 7, the temperature of which ranges from approximately 250 to 300 degrees F. This brings the coating back to an adhesive state. The sheet 3 is conveyed to a point away from the hot plate, at which point it is joined by a sheet of rubber hydrochloride or similar thermoplastic material, which is designated 8. This sheet is supplied from a supply roll 9, over the roller 10, the roller 11 and thence downwardly to the sheet 3. Both sheets then pass between the steel roll 12 and the rubber roll 13, which are preferably geared together through the gears 14, 15 and 16. The upper roll is preferably pressed on the material by the spring 17. These rolls are known as the combining rolls. They are preferably cool, and if necessary, may be chilled by a suitable refrigerant. It is also optional to apply refrigerant rollers at a later stage of the combining operation. The composite sheet is then wound on a rewind re-roller 18. In this condition the sheet is free from any solvent. It can be formed into a container, due to the fact that the thermoplastic sheet 8 is capable of becoming adhesive, upon the application of heat, and optionally, heat and pressure.

Amongst the materials of thermoplastic character for use as a sheet 8, is the material known as "Pliofilm."

It will be understood that I desire to comprehend within my invention such modifications as come within the scope of the claims and the invention.

Having thus fully described my invention, what I claim as new and desire to secure by Letters Patent is:

1. In a process of making a laminated sheet, coating a paper sheet with a solvent containing varnish, drying and expelling the solvent therefrom, heating the paper sheet to render the coating adhesive, and then applying thereto a rubber hydrochloride sheet by means of pressure while the paper sheet is so adhesive.

2. In a method of forming a laminated sheet material for use in making gas-proof containers, comprising coating a flexible fibrous sheet with a varnish containing a solvent, drying and expelling the solvent therefrom, heating said fibrous sheet to render the coating adhesive, and then applying a sheet of thermoplastic media by means of resilient pressure to unite said sheets.

3. In a method of forming a laminated sheet material comprising coating a flexible sheet with a varnish containing a solvent, drying and expelling the solvent therefrom, heating said sheet to render the coating adhesive, and then applying a sheet of thermoplastic media by means of pressure to unite said sheets.

4. In a method of forming a laminated sheet material comprising coating a flexible glassine sheet with a varnish containing a solvent, drying and expelling the solvent therefrom, heating said sheet to render the coating adhesive, and then applying a sheet of rubber hydrochloride by means of pressure to unite said sheets.

5. In a method of forming a laminated sheet material comprising coating a flexible sheet with a varnish containing a solvent, drying and expelling the solvent therefrom, heating said sheet to render the coating adhesive, and then applying a sheet of rubber hydrochloride by means of pressure to unite said sheets.

MELVIN WAGNER